United States Patent Office 3,484,528
Patented Dec. 16, 1969

3,484,528
CYCLOPROPANECARBOXYLIC ACID FLUORIDE AS A FUMIGANT
Robert E. A. Dear and Everett E. Gilbert, Morris Township, N.J., assignors to Allied Chemical Corporation, New York, N.Y., a corporation of New York
No Drawing. Filed May 23, 1967, Ser. No. 640,476
Int. Cl. A01n 9/00
U.S. Cl. 424—317        2 Claims

ABSTRACT OF THE DISCLOSURE

This invention is directed to the use of cyclopropanecarboxylic acid fluoride as a fumigant which is effective against certain insects and other pests at dosages in the range of 0.25 to 1 pound per thousand cubic feet of space fumigated.

CROSS-REFERENCE TO RELATED APPLICATION

This application is a continuation-in-part of U.S. applications of Everett E. Gilbert and Robert E. A. Dear, Ser. No. 636,587, filed May 8, 1967 and Ser. No. 639,010 filed May 17, 1967 (now abandoned), both entitled "Process for the Preparation of Cyclopropanecarboxylic Acid Fluoride."

BACKGROUND OF THE INVENTION

Field of the invention

This application relates to fumigants for controlling pests infesting enclosed spaces. As is known in the art the control of pest organisms which infest hosts such a soil, grain, fruits, vegetables, textiles, dwellings, warehouses and the like is extremely difficult in those cases where the pest organisms penetrate into the interior of the host space. The use of surface poisons or pesticides for this purpose is not consistently effective because of the difficulty in reaching the interior of the space. Although various fumigants have been proposed for controlling such pests there is a need for new and highly effective fumigants.

We have now discovered that cyclopropanecarboxylic acid fluoride can be used as a fumigant and exerts lethal effects even in small dosages against common penetrating pests such as those infesting grain, flour, carpets, etc.

DESCRIPTION OF THE PRIOR ART

The esters of cyclopropanecarboxylic acid are known fumigants as disclosed by U.S. Patent 3,236,728.

However, it has been found that cyclopropanecarboxylic acid fluoride is an outstandingly effective fumigant to such a degree as to be unobvious in view of the known fumigant activity of the acid esters. Furthermore, acid halides of this type are usually readily hydrolyzed with water and therefore would be considered to be unstable for practical application as fumigants. Unexpectedly, however, cyclopropanecarboxylic acid fluoride has been found to be resistant to hydrolysis at ambient temperature.

SUMMARY OF THE INVENTION

Cyclopropanecarboxylic acid fluoride is a known compound having a boiling point of 81–2° C. It can be prepared in the manner described in the above-mentioned U.S. application. Briefly such preparation involves the reaction of gamma butyrolactone with thionyl chloride to form 4-chloro butyryl chloride and the reaction of this latter compound with potassium fluoride at a temperature above 190° C. to form cyclopropanecarboxylic acid fluoride.

In the process of this invention the pests are subjected to an atmosphere comprising a lethal concentration of cyclopropanecarboxylic acid fluoride. This involves contacting the pests with the vapor of cyclopropanecarboxylic acid fluoride in the enclosure in which the pests live. The process of this invention is particularly applicable to combatting pest infestation in flour, grain, textiles and other stored products whether contained in storage bins, grain elevators or the like and also to combatting pests in other enclosed spaces. This process is also effective for control of other pests such as nematodes.

DESCRIPTION OF THE PREFERRED EMBODIMENT

In carrying out the process of this invention the pests are subjected to a toxic concentration of cyclopropanecarboxylic acid fluoride according to well established methods known to the fumigating art. According to a typical method the toxicant is introduced into the enclosure in which the pests exist in such a manner that it is free to diffuse and permeate the atmosphere. A dosage of at least about 0.25 to 1 pound of toxicant per thousand cubic feet of enclosed space is needed to permeate the area and to insure effective control of the pests. The exposure time required depends upon the volume and the type of host e.g. flour or grain, in the enclosed area. In an area of 1000 cubic feet and in large areas such as grain elevators, the time generally required for effective fumigation is from about 24 to about 48 hours.

In treating grain or flour, for example, the toxicant vapor is normally simply released over the grain or flour where it is contained, in an enclosure such as a storage bin, warehouse, grain elevator or the like, and allowed to remain in the enclosure until it has diffused and permeated it. Since the vapor is heavier than air it tends to sink to the bottom of the enclosure and penetrate the grain or flour as it settles, killing the pest organisms.

The effectiveness of cyclopropanecarboxylic acid fluoride as a fumigant is illustrated by the tests and results described below.

Test insects were placed in 1.5 inch diameter salve tins with perforated lids. A small amount of appropriate food (grain, flour, ground dog food, etc.) was placed in each tin. Dosages of cyclopropanecarboxylic acid fluoride in the amounts indicated below were placed in ampoules which were broken in 2-gallon Mason jars. The insect containers were then introduced into the jars and the jars were sealed. After 24 hours exposure the insect containers were removed and after 5 days from initial exposure mortality counts were made. The test results were as follows:

|  | Percent mortality | | | | |
|---|---|---|---|---|---|
|  | CFB | BCB | SGB | YMW | HFP |
| Dosage, lb./1,000 ft.³: | | | | | |
| 1 | 100 | 100 | 100 | 100 | 100 |
| 0.5 | 80 | 0 | 100 | 0 | 100 |
| 0.25 | 20 | 0 | 20 | 0 | 96 |

CFB: Confused flour beetle adults (*Tribolium confusum*).
BCB: Black carpet beetle larvae (*Attagenus piceus*).
SGB: Sawtooth grain beetle adulte (*Oxyzaephilus suranamensis*).
YMW: Yellow mealworm larvae (*Tenebrio molitar*).
HFP: Housefly pupae (*Musca domestica*).

In a similar manner cyclopropanecarboxylic acid fluoride was tested as a fumigant against nematodes as described below:

About 100 nematodes were placed in a small petri dish containing about 5 ml. of distilled water. The dish was placed open in a gallon Mason jar with the indicated dosage of the fumigant being released from an ampoule. As soon as the nematode container and fumigant were in place the jar was sealed. After 20 hours exposure the nematode container was removed and mortality counts were made at 1 day and 3 days after initial exposure. Test results were as follows:

| Dosage, lb./1,000 ft.$^3$: | Percent mortality of nematodes | |
| --- | --- | --- |
| | 1 day | 3 days |
| 1 | 100 | 100 |
| 0.5 | 100 | 100 |
| 0.25 | 100 | 100 |

A comparison between cyclopropanecarboxylic acid fluoride and the ethyl ester of cyclopropanecarboxylic acid showed that the former compound gave complete kill at 1 lb./1000 ft.$^3$ of two insects (Black carpet beetle and Yellow mealworm) on which the ester at the same dosage had no effect whatever, and furthermore, cyclopropanecarboxylic acid fluoride gave nearly complete kill of housefly pupae and nematodes at the low dosage of 0.25 pound per 1000 cubic feet at which dosage the ester was nearly completely ineffective. In addition cyclopropanecarboxylic acid fluoride gave nearly complete kill against confused flour beetles and sawtooth grain beetles at a dosage of 0.5 pound per 1000 cubic feet, at which dosage the ethyl ester, respectively, was less than 50% effective and showed no activity at all.

Since fumigants are exposed to atmospheric moisture during use, stability to aqueous hydrolysis is a required property. Cyclopropanecarboxylic acid fluoride was found to be resistant to hydrolysis by the following test. Approximately 2 ml. each of cyclopropanecarboxylic acid fluoride and water were stirred together periodically and then the mixture was allowed to stand at ambient temperature for 24 hours. No diminution of the volume of the acid fluoride was noted over the 24 hour period, indicating stability to aqueous hydrolysis.

We claim:
1. A process for the control of insect or nematode pests which comprises contacting said pests with a pesticidally effective amount of the vapor of cyclopropanecarboxylic acid fluoride.
2. The process of claim 1 wherein the cyclopropanecarboxylic acid fluoride is employed in a concentration of at least about 0.25 to 1.0 pound per 1000 cubic feet of enclosed space infested by said pests.

References Cited

UNITED STATES PATENTS 3,236,728   2/1966   Newallis et al. _____ 424—305

OTHER REFERENCES

Chemical Abstracts 59: 2660c (1963).

ALBERT T. MEYERS, Primary Examiner

JEROME D. GOLDBERG, Assistant Examiner